J. F. OAKES.
BEAN HARVESTER.
APPLICATION FILED JUNE 10, 1913.
1,111,853.
Patented Sept. 29, 1914.
2 SHEETS—SHEET 2.
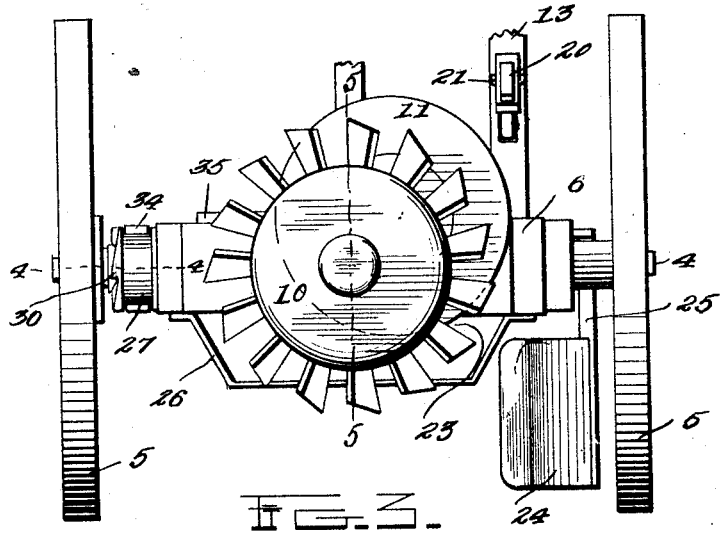
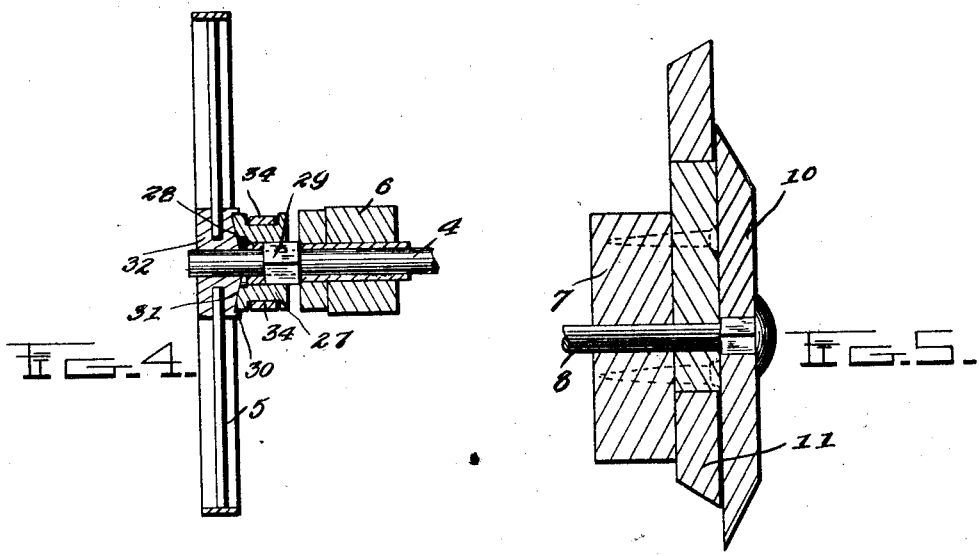
WITNESSES:
INVENTOR.
John F. Oakes,
BY
ATTORNEY.

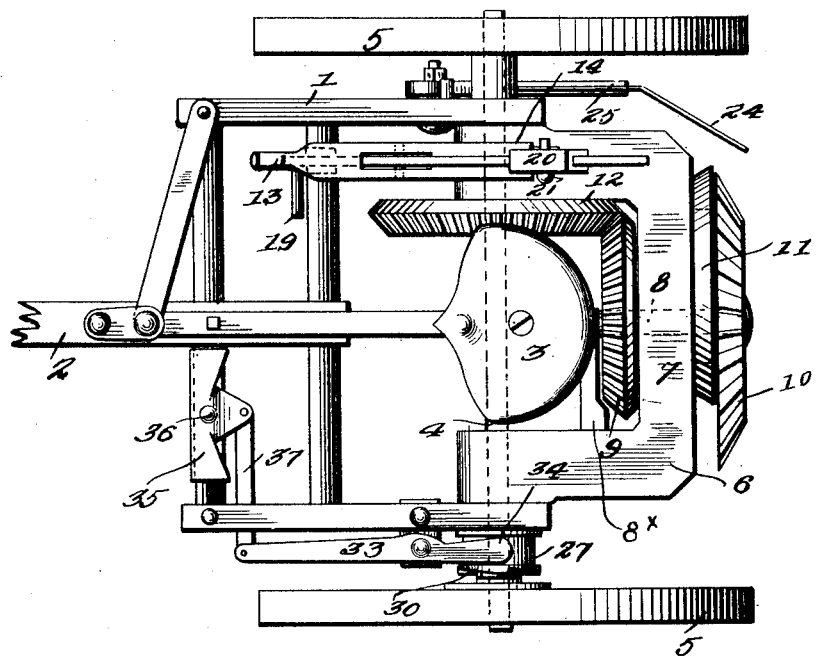

UNITED STATES PATENT OFFICE.

JOHN FRANCIS OAKES, OF COPAS, MINNESOTA.

BEAN-HARVESTER.

1,111,853.  Specification of Letters Patent.  Patented Sept. 29, 1914.

Application filed June 10, 1913. Serial No. 772,864.

*To all whom it may concern:*

Be it known that I, JOHN FRANCIS OAKES, a citizen of the United States, residing at Copas, in the county of Washington and State of Minnesota, have invented certain new and useful Improvements in Bean-Harvesters, of which the following is a specification.

My invention relates to improvements in bean harvesters, and one object is the provision of a machine of this character which will bodily remove the complete vines with their crop of beans in a rapid manner without injury to the beans.

Another object of my invention is the provision of a machine of the character stated which can be easily drawn over the ground and readily controlled by the driver for throwing the mechanism into and out of operation as circumstances require.

Another object of my invention is the provision of a bean harvester which will comprise very few parts to produce a machine of simple, durable and inexpensive construction, which will stand hard usage and not be likely to get out of order, and which in general will be thoroughly efficient and practical in every particular.

With these objects in view my invention consists of a bean harvester embodying novel features of construction and combination of parts substantially as disclosed herein.

In order that the construction in detail and the operation of my invention may be understood and its many advantages be fully appreciated I have illustrated in the accompanying drawing a bean harvester constructed in accordance with my invention.

Figure 1 is a top plan view of a machine embodying my improvements. Fig. 2 is a side elevation of the machine. Fig. 3 is a rear end view of the harvester. Fig. 4 is a sectional view on line 4—4 of Fig. 3, and Fig. 5 is a sectional view on line 5—5 of Fig. 3.

Referring by numeral to the drawings in which similar characters of reference denote corresponding parts in the several views of the drawings: The numeral 1, designates the frame of the machine, 2, the draft connection, 3, the driver's seat, 4, the axle passing through the frame and 5, the ground or supporting wheels of the machine. Upon the axle between the side bars of the frame is mounted a yoke or bail 6 in the cross portion 7 on which is journaled at one end a short longitudinal shaft 8 the other end of which is journaled in an upright $8^x$ and which carries upon one end the bevel gear 9 and upon the other end the toothed disk 10 and between said disk and cross portion 7 is eccentrically mounted on said shaft the disk or wheel 11, said toothed disk and the eccentrically mounted disk providing the bean pulling or extracting devices of the bean harvester. The disk or wheel 11 is rotated with the toothed disk 10, by the engagement of the bean vines and said disks in their pulling action. It will be understood that there is sufficient friction between disks 10 and 11 to cause disk 11 to rotate upon the positive rotation of disk 10, but not in unison therewith. With the bevel gear wheel 9, meshes the driving bevel gear wheel 12, mounted upon the axle and for the purpose of raising and lowering the yoke with the extracting mechanism I employ the hand lever 13, shown depressed in Fig. 1 connected at its lower end 14, to the yoke and having a pin 15, which engages the teeth upon the under side of the rack 16, pivoted at its forward end to the bracket 18, and having a foot piece 19, for raising said rack bar, which rack bar is provided with a sliding weight 20, which is adjustable upon the rack bar by means of the pin 21, and openings 22, in said rack bar.

From this construction it will be observed that the lever for raising and lowering the yoke is arranged adjacent the driver's seat where said lever can be instantly manipulated and also that the weighted rack bar will engage the lever and retain the bean extracting mechanism in the proper adjustment according to the relation of said mechanism with the ground and crop of beans, and also that the eccentric mounting of the disk with reference with the toothed wheel provides the space 23, which receives the vines as they are pulled from the ground and conveys the vines to one side where they are deposited and prevented from contact with the wheel by means of the plate or scoop 24, secured by the hanger or bracket 25, with the frame, and the beveled gear wheel 9, is also provided with a guard or cover plate 26, which prevents foreign matter from contact with said wheel to prevent clogging.

The construction and operation of the bean extracting or pulling mechanism being fully understood I will now describe the mechanism for operating the same; which consists of the sliding clutch collar 27, having a square bearing 28, sliding upon the squared portion 29, of the axle and formed at one face with teeth 30, adapted when shifted to engage the teeth 31, formed upon the hub 32, of one of the ground wheels, in order that when the shifting lever 33, which has the forked end 34, engaging the clutch collar, is operated by the pivoted foot lever 35, pivoted at 36, upon the frame and connected by the link 37, with said shifting lever, said clutch collar is thrown into engagement with the teeth on the hub and the axle rotates with the ground wheels turning the driving bevel wheel 12, which turns gear wheel 9, and operates the bean extracting mechanism. When desired to throw the mechanism out of use it is simply necessary to shift the clutch operating lever through the medium of the foot lever to withdraw the clutch collar from engagement with the toothed hub and to raise the yoke by operating the hand lever at the driver's seat, as will be readily understood.

In use the machine is drawn over the ground the bean extracting mechanism having been lowered to bring the toothed wheel near the ground and the clutch having been operated to cause the axle when revolved to turn the driving gear wheel and operate the bevel gear wheel upon the shaft carrying the toothed wheel, which toothed wheel as it revolves by reason of the inclined or angular arrangement of its teeth draws the vines with a twisting action completely lifting said vines with their crop of beans from the earth, and thus in a rapid and efficient manner pulling the vines with their beans and absolutely removing every vine in the path of said toothed wheel, thus providing a machine which will rapidly remove the vines without injury to the beans, which can be adjusted to suit conditions, which will stand the hard work to which it is subjected and which will prove efficient and practical from every point of view.

I claim:

1. A bean harvester, consisting of a frame, an axle carrying ground wheels mounted in said frame, a yoke pivotally mounted upon the axle, and bean extracting means embodying an eccentrically mounted disk carried by said yoke and operated from the axle.

2. A bean harvester consisting of a frame, an axle mounted in said frame and carrying ground wheels, a yoke swinging from said axle, bean extracting means embodying an eccentrically mounted disk mounted in said yoke, a driving gear mounted on the axle, and a gear carried by said yoke and meshing with said driving gear for operating the bean extracting mechanism.

3. A bean harvester, consisting of a frame, having draft means and carrying a driver's seat, an axle mounted in said frame, ground wheels on said axle, a driving gear wheel mounted on said axle, a yoke swung from said axle, a shaft mounted in said yoke, a gear wheel on said shaft meshing with the driving gear wheel on the axle, a toothed wheel mounted on the other end of said shaft, and an intermediate disk or wheel mounted eccentrically on said shaft and operating substantially parallel with and in conjunction with the toothed wheel.

4. A bean harvester, consisting of the frame, the axle mounted in said frame, the ground wheels on said axle, the toothed hub on one of said wheels, the sliding collar on the axle having teeth adapted to engage the tooth of the hub, the shifting lever for sliding said collar, the foot lever connected with said shifting lever for operating said lever, the driving gear wheel on said axle adapted to be thrown into and out of use by said clutch mechanism, and bean extracting means embodying coacting disks upon the same shaft, one of said disks being disposed eccentrically with relation to the other operated by said driving gear wheel.

5. A bean harvester, consisting of a frame, an axle, ground wheels on said axle, a clutch mechanism carried by the axle and one of said wheels, foot operated mechanism for actuating said clutch, a driving gear wheel on said axle, a swinging frame mounted on the axle, a shaft in said frame, a bevel gear wheel on one end of the shaft meshing with said driving gear wheel, a toothed wheel mounted on the other end of said shaft, and an interposed wheel mounted eccentrically on said shaft between said toothed wheel and frame parallel with and coacting with said toothed wheel.

6. In a bean harvester, the combination with the frame, axle, driving wheels and clutch mechanism, a driving gear wheel mounted on the axle, and a frame swung from the axle and carrying bean extracting means embodying a toothed disk and an eccentrically mounted disk carried by the same shaft and coöperating therewith and operated by said driving gear wheel.

7. In a bean harvester, the combination with the frame, axle, driving wheels and clutch mechanism, a driving gear wheel mounted on the axle, and a frame swung from the axle and carrying bean extracting means embodying a toothed disk and an eccentrically mounted disk carried by the same shaft and coöperating therewith and operated by said driving gear wheel, said means consisting of a shaft mounted in the swinging frame and carrying at one end a meshing gear wheel and at its other end a toothed bean extracting wheel.

8. In a bean harvester, the combination with the frame, axle, driving wheels and clutch mechanism, a swinging frame suspended from the axle, bean extracting means embodying a revoluble toothed disk and an eccentrically mounted disk revoluble in a plane parallel therewith and coöperating therewith, said disks being carried by said frame and operated from the axle, a hand lever connected to said swinging frame, and a weighted rack for securing said hand lever in adjusted position.

In testimony whereof I affix my signature in presence of two witnesses.

JOHN FRANCIS OAKES.

Witnesses:
C. J. RUPPERT,
WM. N. MOORE.

Copies of this patent may be obtained for five cents each, by addressing the "Commissioner of Patents, Washington, D. C."